(12) United States Patent
Kato et al.

(10) Patent No.: US 9,757,982 B2
(45) Date of Patent: Sep. 12, 2017

(54) RUBBER COMPOSITION AND PNEUMATIC TIRE

(71) Applicant: THE YOKOHAMA RUBBER CO., LTD., Minato-ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/114,956

(22) PCT Filed: Dec. 22, 2014

(86) PCT No.: PCT/JP2014/083972
§ 371 (c)(1),
(2) Date: Jul. 28, 2016

(87) PCT Pub. No.: WO2015/114996
PCT Pub. Date: Aug. 6, 2015

(65) Prior Publication Data
US 2016/0355057 A1     Dec. 8, 2016

(30) Foreign Application Priority Data
Jan. 31, 2014   (JP) ................. 2014-016822

(51) Int. Cl.
*B60C 1/00*     (2006.01)
*C08L 9/06*     (2006.01)

(52) U.S. Cl.
CPC .............. *B60C 1/0016* (2013.01); *B60C 1/00* (2013.01); *C08L 9/06* (2013.01)

(58) Field of Classification Search
CPC ............ B60C 1/0016; B60C 1/00; C08L 9/06
USPC ........................................................ 524/526
See application file for complete search history.

(56) References Cited

U.S. PATENT DOCUMENTS

| 3,792,031 A | 2/1974 | Udding |
| 2006/0084730 A1 | 4/2006 | Fukushima et al. |
| 2007/0004869 A1* | 1/2007 | Parker ................... B60C 1/0016 525/333.1 |

FOREIGN PATENT DOCUMENTS

| JP | 47-025712 B1 | 7/1972 |
| JP | 48-016996 A | 3/1973 |
| JP | 2008-517071 A | 5/2008 |
| JP | 2008-208163 A | 9/2008 |
| JP | 2013-032471 A | 2/2013 |

* cited by examiner

*Primary Examiner* — Ling Choi
*Assistant Examiner* — Ronald Grinsted
(74) *Attorney, Agent, or Firm* — Carrier Blackman & Associates, P.C.; Joseph P. Carrier; William D. Blackman

(57) ABSTRACT

An object of the present invention is to provide a rubber composition capable of producing a pneumatic tire with both satisfactory heat build-up reduction and excellent wet skid performance, and a pneumatic tire comprising the rubber composition. The rubber composition of the present invention contains a diene-based rubber containing from 5 to 40 mass % of a modified butadiene rubber and a white filler. The modified butadiene rubber is a modified polymer obtained by modifying an unmodified butadiene rubber (A) with a nitrone compound (B) having a carboxy group.

7 Claims, 1 Drawing Sheet

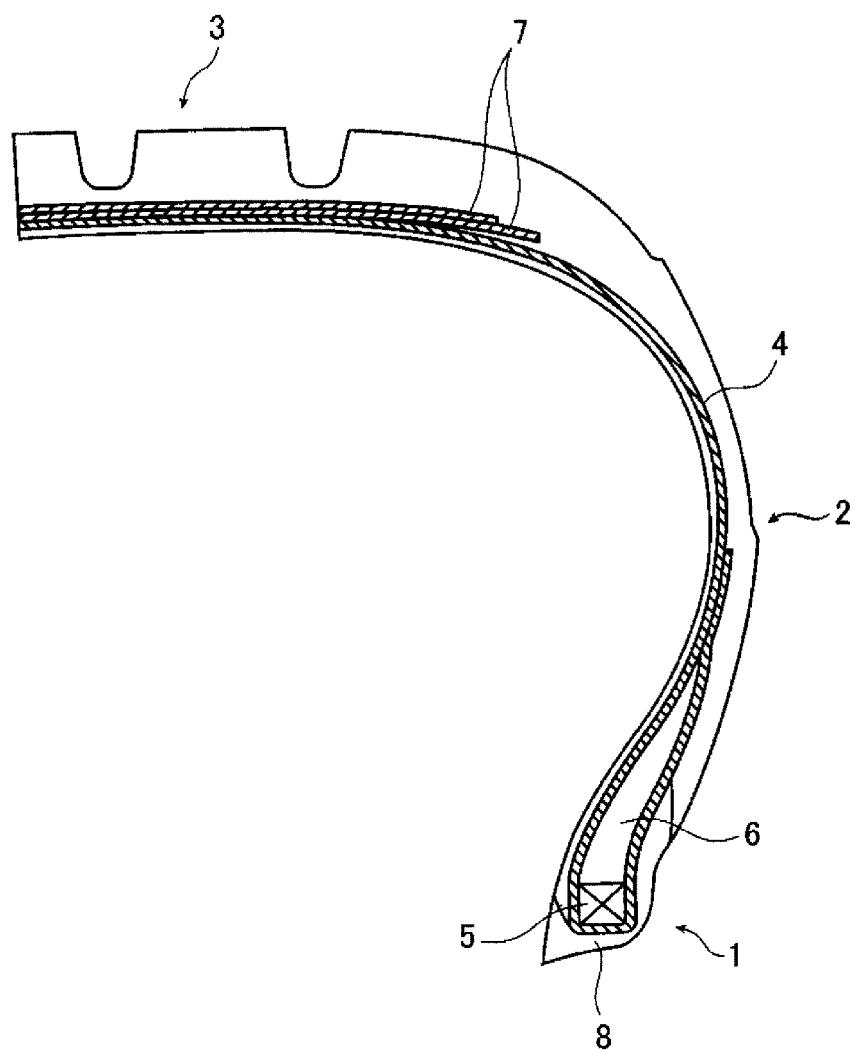

RUBBER COMPOSITION AND PNEUMATIC TIRE

TECHNICAL FIELD

The present invention relates to a rubber composition and a pneumatic tire.

BACKGROUND ART

Modified polymers that are modified by a compound containing a nitrone group (nitrone compound) have been known conventionally as polymers contained in rubber compositions for use in tires and the like.

Patent Document 1, for example, describes a rubber composition comprising, per 100 parts by weight of a diene-based rubber containing from 5 to 100 wt. % of a modified butadiene rubber, from 10 to 120 parts by weight of silica; wherein the modified butadiene rubber is butadiene rubber with a cis-content of 90% or greater modified by a nitrone compound having a nitrogen-containing heterocycle per molecule (Claim 1). Additionally, Patent Document 1 describes modification by a nitrone compound causing heat build-up to decrease (paragraph [0006] and the like).

CITATION LIST

Patent Literature

Patent Document 1: Japanese Unexamined Patent Application Publication No. 2013-32471A

SUMMARY OF INVENTION

Technical Problem

However, upon studying "the rubber composition comprising a modified butadiene rubber modified by a nitrone compound having a nitrogen-containing heterocycle per molecule" described in Patent Document 1, the present inventors discovered that though the rubber composition provided a decrease in heat build-up, some nitrone compounds when used as the modifier decreased wet skid performance.

Therefore, an object of the present invention is to provide a rubber composition capable of producing a pneumatic tire with both satisfactory heat build-up reduction properties and excellent wet skid performance, and a pneumatic tire comprising the rubber composition.

Solution to Problem

As a result of diligent research, the present inventors discovered that a pneumatic tire with both satisfactory heat build-up reduction and excellent wet skid performance can be produced using a rubber composition comprising a specific amount of modified butadiene rubber modified using a nitrone compound having a carboxy group and thus completed the present invention.

Specifically, the present inventors discovered that the problems described above can be solved by the following features.

(1) A rubber composition comprising:
a diene-based rubber containing from 5 to 40 mass % of a modified butadiene rubber; and
a white filler; wherein
the modified butadiene rubber is a modified polymer obtained by modifying an unmodified butadiene rubber (A) with a nitrone compound (B) having a carboxy group.

(2) The rubber composition according to (1), wherein the nitrone compound (B) is represented by Formula (b) below:

[Chemical Formula 1]

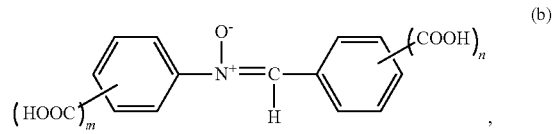

wherein, m and n each independently represent an integer from 0 to 5, and a sum of m and n is 1 or greater.

(3) The rubber composition according to (1) or (2), wherein the nitrone compound (B) is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(4) The rubber composition according to any one of (1) to (3), wherein a content of the silica is from 8 to 130 parts by mass per 100 parts by mass of the diene-based rubber.

(5) The rubber composition according to any one of (1) to (4), wherein a modification ratio of the modified butadiene rubber is from 0.01 to 2.0 mol %.

(6) A pneumatic tire comprising the rubber composition described in any one of (1) to (5).

Advantageous Effects of Invention

As described below, the present invention is able to provide a rubber composition capable of producing a pneumatic tire with both satisfactory heat build-up reduction and excellent wet skid performance, and a pneumatic tire comprising the rubber composition.

BRIEF DESCRIPTION OF DRAWINGS

FIG. 1 is a partial cross-sectional schematic view of a tire that represents one embodiment of a pneumatic tire of the present invention.

DESCRIPTION OF EMBODIMENT

Hereinafter, a rubber composition and a pneumatic tire comprising the rubber composition of the present invention will be described.

Note that in the present specification, numerical ranges indicated using "from . . . to . . . " include the former number as the lower limit value and the later number as the upper limit value.

Rubber Composition

The rubber composition of the present invention contains a diene-based rubber containing from 5 to 40 mass % of a modified butadiene rubber and a white filler. The modified butadiene rubber is a modified polymer obtained by modifying an unmodified butadiene rubber (A) with a nitrone compound (B) having a carboxy group.

The rubber composition of the present invention contains such a modified butadiene rubber at a specific amount. Accordingly, a pneumatic tire produced using the rubber composition has both excellent heat build-up reduction properties and good wet skid performance. Although the reason is not clear, it is assumed to be as follows.

It is considered that when a butadiene rubber modified by a nitrone compound having a carboxy group is used to prepare a compound, the incorporation of white filler (especially silica) and other fillers (especially carbon black) is improved. As a result, such fillers are well dispersed, thus producing reduced heat build-up and good wet skid performance.

Such a reason is also suggested by the results of Comparative Examples 1 and 2 described below in which when a modified butadiene rubber modified by a nitrone compound having a pyridine ring less polar than a carboxy group is used, wet skid performance is decreased.

Hereinafter, the diene-based rubber, the modified butadiene rubber, the preparation method thereof, the white filler, and other additives will be described.

Diene-based Rubber

There are no particular restrictions to the diene-based rubber contained in the rubber composition of the present invention as long as it contains from 5 to 40 mass % of the modified butadiene rubber described below and has double bonds in its main chain, and specific examples thereof include natural rubber (NR), isoprene rubber (IR), unmodified butadiene rubber, acrylonitrile-butadiene rubber (NBR), styrene-butadiene rubber (SBR), styrene-isoprene rubber (SIR), and styrene-isoprene-butadiene rubber (SIBR). One of these diene-based rubbers can be used alone, or a combination of two or more of these diene-based rubbers can be used.

Of these diene-based rubbers, as a diene-based rubber used in combination with the modified butadiene rubber described below, natural rubber (NR), isoprene rubber (IR), and styrene-butadiene rubber (SBR) are preferable.

In the present invention, the amount of the modified butadiene rubber described below contained in the diene-based rubber is from 5 to 40 mass %, preferably from 5 to 20 mass %, and more preferably from 10 to 20 mass %.

Modified Butadiene Rubber

The modified butadiene rubber contained in the rubber composition of the present invention is a modified polymer obtained by modifying an unmodified butadiene rubber (A) with a nitrone compound (B) having a carboxy group.

Unmodified Butadiene Rubber

The unmodified butadiene rubber (A) described above is a butadiene rubber containing a carbon-carbon unsaturated bond.

Note that "unmodified" refers to a state that is not modified with the nitrone compound (B) described below, and the word "unmodified" does not exclude polymers that have been modified with other components (especially terminal-unmodified modified polymers).

The unmodified butadiene rubber (A) described above is preferably a butadiene rubber with a high cis structure, as in Patent Document 1, and is specifically a butadiene rubber with a cis-1,4 bond content of 90% or greater and preferably 95% or greater, because such an unmodified butadiene rubber has increased heat build-up reduction properties.

Note that such a butadiene rubber with a high cis structure can be polymerized by a typical method using a Ziegler catalyst, neodymium catalyst, or the like.

The unmodified butadiene rubber (A) described above preferably has a weight average molecular weight of from 50,000 to 1,000,000, and more preferably from 200,000 to 800,000. The weight average molecular weight being within such a range enables improved wear resistance and low-temperature properties of the butadiene rubber. The weight average molecular weight (Mw) of the unmodified butadiene rubber (A) is measured by gel permeation chromatography (GPC) on the basis of standard polystyrene using tetrahydrofuran as a solvent.

Nitrone Compound (B)

The nitrone compound (B) described above is not particularly limited as long as the nitrone compound (B) is a nitrone having at least one carboxy group (—COOH) (hereinafter, also referred to as "carboxynitrone" for convenience). For example, a carboxynitrone represented by Formula (b) below is suitable for use. Note that "nitrone" is a generic term for compounds in which an oxygen atom is bonded to a nitrogen atom of a Schiff base.

[Chemical Formula 2]

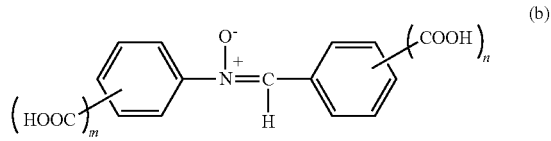

(b)

In Formula (b), m and n each independently represent an integer from 0 to 5, and a sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

The compound is not particularly limited to a carboxynitrone such as that represented by Formula (b) but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 3]

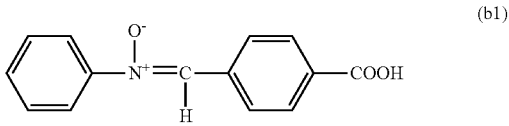

(b1)

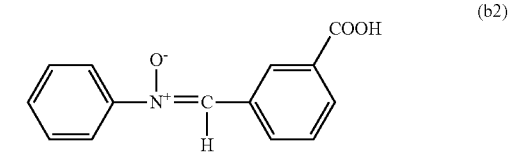

(b2)

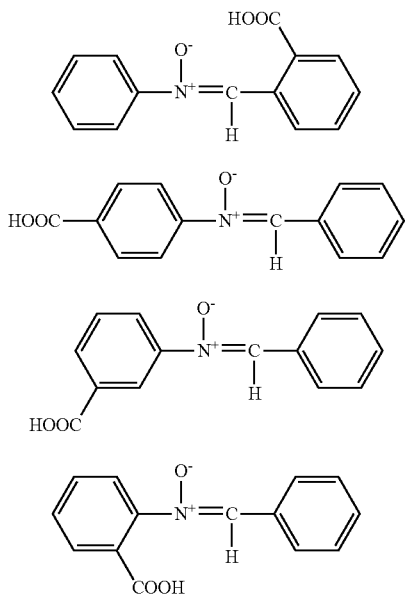

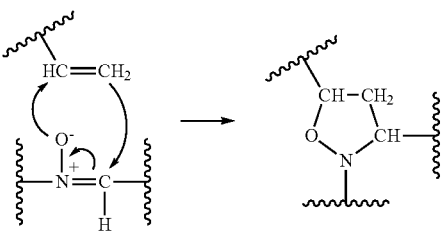

The method of synthesizing the nitrone compound (B) is not particularly limited, and conventionally known methods can be used. For example, nitrones having a nitrone group are obtained by stirring a compound having a hydroxyamino group (—NHOH) and a compound having an aldehyde group (—CHO) at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for from 1 to 24 hours to allow both groups to react.

Method of Preparing Modified Butadiene Rubber

The method for producing modified butadiene rubber is not limited to a particular method. Examples of the method include blending the unmodified butadiene rubber (A) described above and the nitrone compound (B) at a temperature of from 100° C. to 200° C. for from 1 to 30 minutes.

When blended as such, a cycloaddition reaction occurs between the double bond of the conjugated diene contained in the unmodified butadiene rubber and the nitrone group in the nitrone compound (B), forming a five-membered ring as illustrated in Formula (I) and Formula (II) below. Note that Formula (I) below represents a reaction between a 1,4 bond and a nitrone compound, and Formula (II) below represents a reaction between a 1,2-vinyl bond and a nitrone compound.

[Chemical Formula 4]

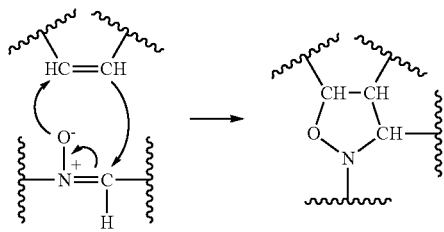

Here, the amount of the nitrone compound (B) reacted with the unmodified butadiene rubber (A) is preferably from 0.1 to 10 parts by mass and more preferably from 0.3 to 5 parts by mass, per 100 parts by mass of the unmodified butadiene rubber (A).

In the present invention, the modification ratio of the modified butadiene rubber prepared in such a manner is not particularly limited. However, from the perspective of increasing the heat build-up reduction properties, the modification ratio is preferably from 0.01 to 2.0 mol %, and more preferably from 0.02 to 1.5 mol %.

Here, "modification ratio" refers to the proportion (mol %) of the double bonds of the conjugated diene contained in the unmodified butadiene rubber (A) that are modified with the nitrone compound (B), and specifically, the proportion (mol %) formed in the structure of Formula (I) or Formula (II) above via modification by the nitrone compound (B). The modification ratio, for example, can be found by performing NMR measurement of the unmodified butadiene rubber (A) and the modified butadiene rubber (i.e., the polymer before and after modification).

White Filler

Specific examples of the white filler contained in the rubber composition of the present invention are silica, calcium carbonate, magnesium carbonate, talc, clay, alumina, aluminum hydroxide, titanium oxide, calcium sulfate, and the like. One of these can be used alone, or a combination of two or more can be used.

Of these examples, silica is preferable because of its interaction with the modified group (carboxy group) of the modified butadiene rubber.

Specific examples of silica are wet silica (hydrous silicic acid), dry silica (silicic anhydride), calcium silicate, aluminum silicate, and the like. One of these can be used alone, or a combination of two or more can be used.

In the present invention, the content of the white filler described above is preferably from 8 to 130 parts by mass, and more preferably from 30 to 100 parts by mass, per 100 parts by mass of the diene-based rubber described above.

Carbon Black

The rubber composition of the present invention preferably contains carbon black.

The carbon black is not particularly limited and, for example, carbon blacks of various grades, such as SAF-HS, SAF, ISAF-HS, ISAF, ISAF-LS, IISAF-HS, HAF-HS, HAF, HAF-LS, FEF, and the like, can be used.

The content of the carbon black is not particularly limited, but is preferably from 1 to 80 parts by mass, and more preferably from 3 to 50 parts by mass, per 100 parts by mass of the diene-based rubber described above.

Silane Coupling Agent

When the rubber composition of the present invention contains the white filler (especially silica) described above, the rubber composition preferably contains a silane coupling agent because it improves the reinforcing performance of the tire.

When the silane coupling agent is used, a content thereof is preferably from 3 to 15 parts by mass, and more preferably from 4 to 10 parts by mass, per 100 parts by mass of the white filler described above.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Of these examples, to improve the reinforcing properties of the tire, bis(3-triethoxysilylpropyl)tetrasulfide and/or bis (3-triethoxysilylpropyl)disulfide is preferably used. Specific examples thereof include Si69 (bis(3-triethoxysilylpropyl) tetrasulfide, manufactured by Evonik Degussa), Si75 (bis(3-triethoxysilylpropyl)disulfide, manufactured by Evonik Degussa), and the like.

Other Additives

The rubber composition of the present invention contains the diene-based rubber, the white filler, the carbon black, and the silane coupling agent described above. Additionally, the rubber composition can contain various other additives typically used in a rubber composition for a tire including a filler such as calcium carbonate; a vulcanizing agent such as sulfur; a sulfenamide-based, guanidine-based, thiazole-based, thiourea-based, or thiuram-based vulcanization accelerator; a vulcanization accelerator aid such as zinc oxide and stearic acid; wax; aroma oil, an anti-aging agent; and a plasticizer.

The compounded amount of these additives may be any conventional amount, as long as the object of the present invention is not impaired. For example, the compounded amounts per 100 parts by mass of the diene-based rubber may be: sulfur: from 0.5 to 5 parts by mass, vulcanization accelerator: from 0.1 to 5 parts by mass, vulcanization accelerator aid: from 0.1 to 10 parts by mass, anti-aging agent: from 0.5 to 5 parts by mass, wax: from 1 to 10 parts by mass, and aroma oil: from 5 to 30 parts by mass.

Method for Producing Rubber Composition

The method for producing the composition of the present invention is not particularly limited, and specific examples thereof include a method whereby each of the above-mentioned components is kneaded using a publicly known method and device (e.g. Banbury mixer, kneader, roll, and the like). When the composition of the present invention contains sulfur or a vulcanization accelerator, the components other than the sulfur and the vulcanization accelerator are preferably blended first (for example, blended at a temperature of from 60° C. to 160° C.), then cooled, before blending the sulfur and the vulcanization accelerator.

In addition, the composition of the present invention can be vulcanized or crosslinked under conventional, publicly known vulcanizing or crosslinking conditions.

Pneumatic Tire

The pneumatic tire of the present invention is a pneumatic tire that comprises the composition of the present invention. Moreover, the pneumatic tire of the present invention is preferably a pneumatic tire that comprises the rubber composition of the present invention in the tire tread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

The present invention is described below in detail using examples, but is in no way limited to these examples.

Synthesis of Nitrone Compound (Carboxynitrone)

In a 2 L pear-shaped flask, methanol heated to 40° C. (900 mL) was placed, and then terephthalaldehydic acid represented by Formula (2) below (30.0 g) was added and dissolved. To this solution, a solution in which phenylhydroxylamine represented by Formula (1) below (21.8 g) was dissolved in methanol (100 mL) and was added and stirred at room temperature for 19 hours. After the completion of stirring, the nitrone compound represented by Formula (3) below (41.7 g) was obtained by recrystallization from methanol. The yield was 86%.

[Chemical Formula 5]

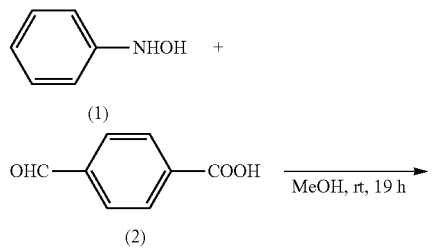

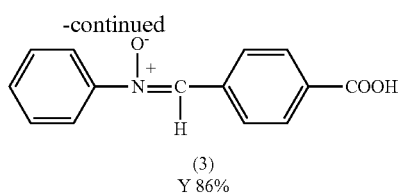

(3)
Y 86%

Synthesis of Nitrone Compound (Pyridylnitrone)

In a 2 L pear-shaped flask, methanol heated to 40° C. (900 mL) was placed, and then pyridine-2-carbaldehyde represented by Formula (5) below (21.4 g) was added and dissolved. To this solution, a solution in which phenylhydroxylamine represented by Formula (4) below (21.8 g) was dissolved in methanol (100 mL) and was added and stirred at room temperature for 19 hours. After the completion of stirring, pyridylnitrone (39.0 g) represented by Formula (6) below was obtained by recrystallization from methanol. The yield was 90%.

[Chemical Formula 6]

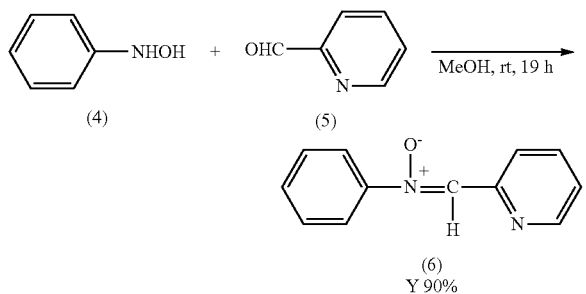

(6)
Y 90%

Preparation of Modified Butadiene Rubber

Unmodified butadiene rubber (BR) (NIPOL BR1220, manufacture by Zeon Corporation) was charged in a banbury mixer with a temperature of 120° C. and masticated for two minutes. Thereafter, the synthesized carboxynitrone or pyridylnitrone was blended at the proportion (parts by mass) shown in Table 1 below, and the mixture was mixed under the modification conditions (temperature, duration) shown in Table 1 to prepare modified butadiene rubbers 1 to 8. Note that "molar ratio (nitrone/BR)" in Table 1 below refers to the molar ratio between the nitrone and the double bonds of the unmodified BR.

The obtained modified butadiene rubbers 1 to 8 were measured via NMR and the modification ratio of each was found. Specifically, in the cases in which carboxynitrone was used, the polymers before and after modification were measured for the peak area (derived from two protons adjacent to the carboxy group) at around 8.08 ppm via $^1$H-NMR (CDCl$_3$, 400 MHz, TMS) using CDCl$_3$ as a solvent to find the modification ratio. Specifically, in the cases in which pyridylnitrone was used, the modification ratio was found in a similar manner except that the peak area derived from the pyridyl group was measured. Note that the samples used in the $^1$H-NMR measurement of the modified polymer (modified butadiene rubber) were dissolved in toluene, purified by methanol precipitation two times, and then dried under reduced pressure. The results are shown in Table 1.

TABLE 1

| Table 1 | Modified butadiene rubber | | | | | | | |
| --- | --- | --- | --- | --- | --- | --- | --- | --- |
|  | 1 | 2 | 3 | 4 | 5 | 6 | 7 | 8 |
| BR (unmodified) | 100.00 | 100.00 | 100.00 | 100.00 | 100.00 | 100.00 | 100.00 | 100.00 |
| Carboxynitrone | 1.90 | 3.80 | 1.20 | 3.00 | 2.30 | 7.70 | 0.30 | — |
| Pyridylnitrone | — | — | — | — | — | — | — | 1.20 |
| Modification conditions | 160° C. 5 min | 160° C. 5 min | 160° C. 5 min | 160° C. 5 min | 170° C. 2 min | 170° C. 2 min | 160° C. 5 min | 160° C. 5 min |
| Molar ratio (Nitrone/BR) | 0.43 | 0.85 | 0.27 | 0.67 | 0.52 | 1.72 | 0.07 | 0.33 |
| Modification ratio (mol %) | 0.15 | 0.31 | 0.17 | 0.45 | 0.40 | 1.23 | 0.05 | 0.16 |

Standard Example 1, Comparative Example 1, and Working Examples 1 and 2

The components shown in (SBR/BR) Table 2 below were blended in the proportions (parts by mass) shown in Table 2.

Specifically, the components shown in Table 2 below except from sulfur and the vulcanization accelerator were first mixed in a Banbury mixer with a temperature of 80° C. for 5 minutes. Thereafter, a roll was used to mix in the sulfur and the vulcanization accelerator to obtain a rubber composition.

Standard Example 2, Comparative Examples 2 and 3, and Working Examples 3 to 7

The components shown in (NR/SBR/BR) Table 3 below were blended in the proportions (parts by mass) shown in Table 3.

Specifically, the components shown in Table 3 below except from sulfur and the vulcanization accelerator were first mixed in a Banbury mixer with a temperature of 80° C. for 5 minutes. Thereafter, a roll was used to mix in the sulfur and the vulcanization accelerator to obtain a rubber composition.

Manufacture of Vulcanized Rubber Sheet for Evaluation

The prepared rubber compositions (unvulcanized) were vulcanized by compression molding in a predetermined mold at 160° C. for 20 minutes to manufacture vulcanized rubber test samples.

Heat Build-up: tan δ (60° C.)

The loss tangent at a temperature of 60° C., tan δ (60° C.), was measured for each vulcanized rubber test sample manufactured as described above using a viscoelastic spectrometer (manufactured by Toyo Seiki Seisaku-sho, Ltd.) under the following conditions: 10% initial distortion, ±2% amplitude, and 20 Hz frequency.

Note that in Table 2 below, the measurement results are expressed as index values against the results of Standard Example 1 (100). In Table 3, the measurement results are expressed as index values against the results of Standard Example 2 (100). Smaller index values (i.e. smaller value of tan δ (60° C.)) indicate lower heat build-up (preferred result).

Wet Skid Performance

The vulcanized rubber test samples manufactured as described above were measured in accordance with the method of ASTM E-303-83 using a portable skid tester manufactured by Stanley under wet road surface conditions.

Note that in Table 2 below, the measurement results are expressed as index values against the results of Standard Example 1 (100). In Table 3, the measurement results are expressed as index values against the results of Standard Example 2 (100). Greater index values indicate superior wet skid performance.

TABLE 2

| (SBR/BR) | Standard Example 1 | Comparative Example 1 | Working Example 1 | Working Example 2 |
|---|---|---|---|---|
| SBR 1 | 49.50 | 49.50 | 49.50 | 49.50 |
| SBR 2 | 66.00 | 66.00 | 66.00 | 66.00 |
| BR | 16.00 | — | — | — |
| Modified BR 1 | — | — | 16.00 | — |
| Modified BR 2 | — | — | — | 16.00 |
| Modified BR 8 | — | 16.00 | — | — |
| Silica | 70.00 | 70.00 | 70.00 | 70.00 |
| Carbon black | 10.00 | 10.00 | 10.00 | 10.00 |
| Processing aid | 4.00 | 4.00 | 4.00 | 4.00 |
| Anti-aging agent | 3.00 | 3.00 | 3.00 | 3.00 |
| Stearic acid | 2.00 | 2.00 | 2.00 | 2.00 |
| Wax | 1.00 | 1.00 | 1.00 | 1.00 |
| Zinc oxide | 2.00 | 2.00 | 2.00 | 2.00 |
| Silane coupling agent | 9.00 | 9.00 | 9.00 | 9.00 |
| Oil | 5.00 | 5.00 | 5.00 | 5.00 |
| Vulcanization accelerator (CZ) | 2.00 | 2.00 | 2.00 | 2.00 |
| Vulcanization accelerator (DPG) | 1.50 | 1.50 | 1.50 | 1.50 |
| Sulfur | 1.00 | 1.00 | 1.00 | 1.00 |
| Heat build-up | 100 | 95 | 94 | 91 |
| Wet skid performance | 100 | 100 | 126 | 128 |

TABLE 3

| Table 3 (NR/SBR/BR) | Standard Example 2 | Comparative Example 2 | Working Example 3 | Working Example 4 | Working Example 5 | Working Example 6 | Working Example 7 | Comparative Example 3 |
|---|---|---|---|---|---|---|---|---|
| NR | 16.00 | 16.00 | 16.00 | 16.00 | 16.00 | 16.00 | 16.00 | 16.00 |
| SBR 3 | 98.00 | 98.00 | 98.00 | 98.00 | 98.00 | 98.00 | 98.00 | 110.38 |
| BR | 13.00 | — | — | — | — | — | — | — |
| Modified BR 3 | — | — | 13.00 | — | — | — | — | — |
| Modified BR 4 | — | — | — | 13.00 | — | — | — | 4.00 |
| Modified BR 5 | — | — | — | — | 13.00 | — | — | — |
| Modified BR 6 | — | — | — | — | — | 13.00 | — | — |
| Modified BR 7 | — | — | — | — | — | — | 13.00 | — |
| Modified BR 8 | — | 13.00 | — | — | — | — | — | — |
| Carbon black | 20.00 | 20.00 | 20.00 | 20.00 | 20.00 | 20.00 | 20.00 | 20.00 |
| Silica | 60.00 | 60.00 | 60.00 | 60.00 | 60.00 | 60.00 | 60.00 | 60.00 |
| Stearic acid | 2.00 | 2.00 | 2.00 | 2.00 | 2.00 | 2.00 | 2.00 | 2.00 |
| Processing aid | 2.00 | 2.00 | 2.00 | 2.00 | 2.00 | 2.00 | 2.00 | 2.00 |
| Anti-aging agent | 3.00 | 3.00 | 3.00 | 3.00 | 3.00 | 3.00 | 3.00 | 3.00 |
| Wax | 1.00 | 1.00 | 1.00 | 1.00 | 1.00 | 1.00 | 1.00 | 1.00 |
| Silane coupling agent | 4.80 | 4.80 | 4.80 | 4.80 | 4.80 | 4.80 | 4.80 | 4.80 |
| Oil | 16.17 | 16.17 | 16.17 | 16.17 | 16.17 | 16.17 | 16.17 | 16.17 |
| Zinc oxide | 3.00 | 3.00 | 3.00 | 3.00 | 3.00 | 3.00 | 3.00 | 3.00 |
| Sulfur | 1.85 | 1.85 | 1.85 | 1.85 | 1.85 | 1.85 | 1.85 | 1.85 |
| Vulcanization accelerator (CZ) | 2.30 | 2.30 | 2.30 | 2.30 | 2.30 | 2.30 | 2.30 | 2.30 |
| Vulcanization accelerator (DPG) | 0.65 | 0.65 | 0.65 | 0.65 | 0.65 | 0.65 | 0.65 | 0.65 |
| Heat build-up | 100 | 95 | 94 | 89 | 88 | 83 | 96 | 105 |
| Wet skid performance | 100 | 101 | 106 | 108 | 111 | 116 | 103 | 103 |

The details of the components shown in Table 2 and Table 3 above are as follows.

SBR 1: Nipol NS522 (oil extending quantity per 100 parts by mass of the rubber component: 37.5 parts by mass (rubber content per 49.5 parts by mass: 36 parts by mass), styrene content: 39 mass %, vinyl content: 42 mass %, manufactured by Zeon Corporation)

SBR 2: TUFDENE F3835 (oil extending quantity per 100 parts by mass of the rubber component: 37.5 parts by mass (rubber content per 66 parts by mass: 48 parts by mass), styrene content: 39 mass %, vinyl content: 36 mass %, manufactured by Asahi Kasei Corporation)

SBR 3: TUFDENE E580 (oil extending quantity per 100 parts by mass of the rubber component: 37.5 parts by mass (rubber content per 98 parts by mass: 71 parts by mass), manufactured by Asahi Kasei Corporation)

NR: TSR20

BR: Nipol BR1220 (manufactured by Zeon Corporation)

Modified BR 1 to 8: Modified butadiene rubber described in Table 1 above

Silica: ZEOSIL 165GR (manufactured by Rhodia Silica Korea Co., Ltd.)

Carbon black: SEAST 9M (manufactured by Tokai Carbon Co., Ltd.)

Processing aid: Fatty acid zinc salt compound (Struktol EF44, manufactured by Schill & Seilacher GmbH & Co.)

Anti-aging agent: SANTOFLEX 6PPD, manufactured by Soltia Europe

Stearic acid: Stearic acid YR (manufactured by NOF Corporation)

Wax: SANNOC (manufactured by Ouchi Shinko Chemical Industrial Co., Ltd.)

Zinc white: Zinc White No. 3 (Seido Chemical Industry Co., Ltd.)

Silane coupling agent: Si69 (manufactured by Evonik Degussa)

Oil: Extract 4S (manufactured by Showa Shell Sekiyu K.K.)

Sulfur: oil treatment sulfur (manufactured by Karuizawa Refinery Ltd.)

Vulcanization accelerator (CZ): Nocceler CZ-G (manufactured by Ouchi Shinko Chemical Industrial Co., Ltd.)

Vulcanization accelerator (DPG): Soxinol D-G (manufactured by Sumitomo Chemical Co., Ltd.)

As seen from the results shown in Table 2 and Table 3 above, the rubber compositions comprising a modified butadiene rubber (modified BR 8) modified using a pyridylnitrone (Comparative Examples 1 and 2) had good heat build-up reduction properties compared to the corresponding Standard Examples 1 and 2 but unfavorable wet skid performance.

On the other hand, the rubber compositions comprising the modified butadiene rubbers (modified BR 1 to 7) modified using a carboxynitrone (Working Examples 1 and 2 and Working Examples 3 to 7) had good heat build-up reduction properties as well as good wet skid performance compared to the corresponding Standard Examples 1 and 2.

Also, as is clear from a comparison of Working Example 4 and Comparative Example 3, a rubber composition having a proportion of diene-based rubber of 5 mass % or less (Comparative Example 3) has unfavorable heat build-up even though it contains a modified butadiene rubber modified using a carboxynitrone (modified BR 4).

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A rubber composition comprising:
a diene-based rubber containing from 5 to 40 mass % of a modified butadiene rubber; and
a white filler; wherein
the modified butadiene rubber is a modified polymer obtained by modifying an unmodified butadiene rubber (A) with a nitrone compound (B) having a carboxy group; wherein the nitrone compound (B) is
a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-arboxyphenyl)-α-phenylnitrone, N-(3-carboxyphenyl)-α-phenylnitrone, and N-(2-carboxyphenyl)-α-phenylnitrone.

2. The rubber composition according to claim 1, wherein a content of the white filler is from 8 to 130 parts by mass per 100 parts by mass of the diene-based rubber.

3. The rubber composition according to claim 1, wherein a modification ratio of the modified butadiene rubber is from 0.01 to 2.0 mol %.

4. A pneumatic tire comprising the rubber composition described in claim 1.

5. The rubber composition according to claim 2, wherein a modification ratio of the modified butadiene rubber is from 0.01 to 2.0 mol %.

6. A pneumatic tire comprising the rubber composition described in claim 2.

7. A pneumatic tire comprising the rubber composition described in claim 3.

* * * * *